US009964202B2

(12) United States Patent
Macik

(10) Patent No.: US 9,964,202 B2
(45) Date of Patent: May 8, 2018

(54) MAINTENANCE TOOL FOR A PLANETARY GEAR

(71) Applicant: Moventas Gears Oy, Jyväskylä (FI)

(72) Inventor: James Allen Macik, Coahoma, TX (US)

(73) Assignee: MOVENTAS GEARS OY, Jyväskylä (FI)

( * ) Notice: Subject to any disclaimer, the term of this patent is extended or adjusted under 35 U.S.C. 154(b) by 212 days.

(21) Appl. No.: 14/681,812

(22) Filed: Apr. 8, 2015

(65) Prior Publication Data
US 2016/0298597 A1 Oct. 13, 2016

(51) Int. Cl.
F16H 57/08 (2006.01)
B25B 27/04 (2006.01)
(Continued)

(52) U.S. Cl.
CPC ......... F16H 57/082 (2013.01); B25B 27/026 (2013.01); B25B 27/04 (2013.01);
(Continued)

(58) Field of Classification Search
CPC ..... B25B 27/04; B25B 27/026; F16H 57/082; F16H 57/023; F16H 2057/0062; F03D 80/50; F05B 2260/40311
See application file for complete search history.

(56) References Cited

U.S. PATENT DOCUMENTS 2,916,813 A * 12/1959 Belanger ............... B25B 27/023
29/256
3,355,789 A * 12/1967 Tetsull ..................... F16H 1/20
29/407.1
(Continued)

FOREIGN PATENT DOCUMENTS

| CN | 103567743 A * | 2/2014 | |
| DE | 20 2007 016 624 U1 | 4/2008 | |
| EP | 1 677 032 A1 | 7/2006 | |
| JP | 07-088734 A | 4/1995 | |
| JP | 07-314266 A | 12/1995 | |
| JP | 5116840 B2 * | 1/2013 | ............. B23P 19/02 |
| WO | WO 2009122495 A1 * | 10/2009 | ............. B23P 19/02 |
| WO | WO 2012/039822 A1 | 3/2012 | |

OTHER PUBLICATIONS

Boneham Pull Dowel Pins <http://web.archive.org/web/20130506051604/http://www.bonehamusa.com/products/dowel-pins/pull-dowel-pins/> archive.org retrieved Mar. 6, 2017. Published May 6, 2013.*

(Continued)

Primary Examiner — Jacob Cigna
(74) Attorney, Agent, or Firm — Birch, Stewart, Kolasch & Birch, LLP

(57) ABSTRACT

A maintenance tool for a planetary gear comprises a force generating device (101) comprising an actuator (102) for fastening to an end of a planet wheel pin of the planetary gear and for directing axial force to the planet wheel pin, and a body structure (104) for mechanically supporting a frame of the force generating device with respect to the planet carrier of the planetary gear so as to allow the actuator to move the planet wheel pin axially with respect to the planet carrier. In many cases, the maintenance tool enables removal of a planet wheel pin and installing, the same or another planet wheel pin at an operating site of the planetary gear. Thus, there is no need to move the planetary gear away from its operating site, e.g. a nacelle of a wind power plant, for maintenance work comprising removal of one or more planet wheel pins.

11 Claims, 3 Drawing Sheets

(51) Int. Cl.
*F16H 57/023* (2012.01)
*B25B 27/02* (2006.01)
*F16H 57/00* (2012.01)
*F03D 80/50* (2016.01)

(52) U.S. Cl.
CPC ............ *F16H 57/023* (2013.01); *F03D 80/50* (2016.05); *F05B 2260/40311* (2013.01); *F16H 2057/0062* (2013.01); *Y02E 10/726* (2013.01)

(56) References Cited

U.S. PATENT DOCUMENTS

| | | | | |
|---|---|---|---|---|
| 3,750,500 A * | 8/1973 | Peterson | ................... | B25D 1/16 254/18 |
| 5,075,948 A * | 12/1991 | Maier | ................... | B25B 27/023 29/264 |
| 5,159,744 A | 11/1992 | Stewart | | |
| 6,629,369 B1 * | 10/2003 | Korner | ................... | F16H 47/085 29/893.1 |
| 7,644,482 B2 * | 1/2010 | Albers | ................... | F03D 80/50 29/402.01 |
| 2010/0170077 A1 * | 7/2010 | Kinoshita | ........... | F16H 25/2252 29/466 |
| 2011/0000063 A1 * | 1/2011 | Sueoka | ................. | B23P 21/006 29/33 P |
| 2014/0171255 A1 * | 6/2014 | Fox | ........................ | F16H 57/082 475/347 |
| 2014/0259590 A1 * | 9/2014 | Eddy | ....................... | F03D 1/003 29/402.03 |

OTHER PUBLICATIONS

European Search Report dated Aug. 12, 2016 in corresponding EP Application No. 16 16 2853 (in English).

* cited by examiner

MAINTENANCE TOOL FOR A PLANETARY GEAR

FIELD OF THE DISCLOSURE

The disclosure relates generally to maintenance of planetary gears. More particularly, the disclosure relates to a maintenance tool for a planetary gear. Furthermore, the disclosure relates to a method for maintaining a planetary gear.

BACKGROUND

A planetary gear comprises a planet carrier, a sun shaft, a gear ring, and planet wheels supported by the planet carrier so that the planet wheels are meshing with the sun shaft and with the gear ring. In cases where the gear ring is stationary, the gear ratio between the sun shaft and the planet wheel carrier is $Z_R/Z_S+1$, where $Z_R$ is the number of teeth of the gear ring and $Z_S$ is the number of teeth of the sun shaft. The planet carrier in its simple form comprises a first end-section for supporting first ends of the planet wheel pins and a second end-section for supporting the second ends of the planet wheel pins. The planet wheel pins can be attached for example with thermal shrink fits to the respective holes of the end-sections of the planet carrier. In order to increase the mechanical stiffness, the planet carrier may further comprise support sections between its end-sections.

Maintenance of a planetary gear comprises often, or at least sometimes, removal of one or more planet wheel pins from the planetary gear in order to be able to remove one or more planet wheels that need to be replaced with new ones or repaired. In many cases, maintenance work of the kind described above requires moving the planetary gear away from its operating site to a mechanical repair plant where there are appropriate means for detaching planet wheel pins from the planet carrier of the planetary gear and means for installing planet wheel pins on the planet carrier. Moving the planetary gear from its operating site to the mechanical repair plant can be a laborious task especially in conjunction with wind power applications where the operating site of the planetary gear is typically a nacelle that is located at the top of a tower.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the present invention, there is provided a new maintenance tool for a planetary gear. A maintenance tool according to the invention comprises:

a force generating device, e.g. a hydraulic device, comprising an actuator for fastening to an end of a planet wheel pin of the planetary gear and for directing axial force to the planet wheel pin, the actuator being movable with respect to a frame of the force generating device and an end of the actuator being a threaded rod for matching a centric and axial threaded hole of the end of the planet wheel pin, and a body structure for mechanically supporting the frame of the force generating device with respect to the planet carrier of the planetary gear so as to allow the actuator to move the planet wheel pin axially with respect to the planet carrier.

In many cases, the above-described maintenance tool makes it possible to remove a planet wheel pin from the planer carrier and to install the same or another planet wheel pin on the planet carrier at the operating site of the planetary gear. Thus, there is no need to move the planetary gear away from its operating site, e.g. a nacelle of a wind power plant, for maintenance work which comprises removal of one or more planet wheel pins.

In accordance with the present invention, there is provided also a new method for maintaining a planetary gear. A method according to the invention comprises at least the following actions at an operating site of the planetary gear:

installing a maintenance tool according to the invention so that the maintenance tool becomes mechanically supported with respect to the planet carrier of the planetary gear, pulling out a planet wheel pin from the planet carrier by operating the maintenance tool, and pushing the planet wheel pin or another planet wheel pin into the planet carrier by operating the maintenance tool.

The operating site of the planetary gear where the above-mentioned method is carried out can be, for example but not necessarily, a nacelle of a wind power plant.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
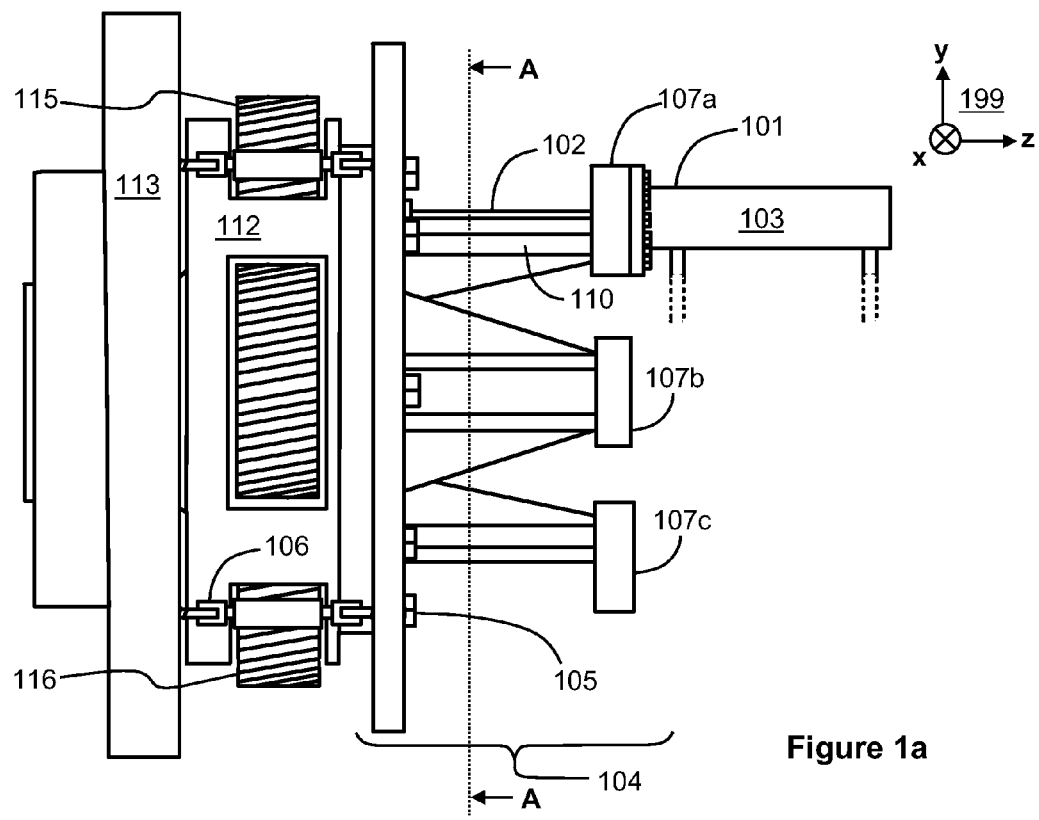
FIGS. 1a, 1b, 1c and 1d illustrate a maintenance tool according to an exemplifying and non-limiting embodiment of the invention.
Figure 1B:
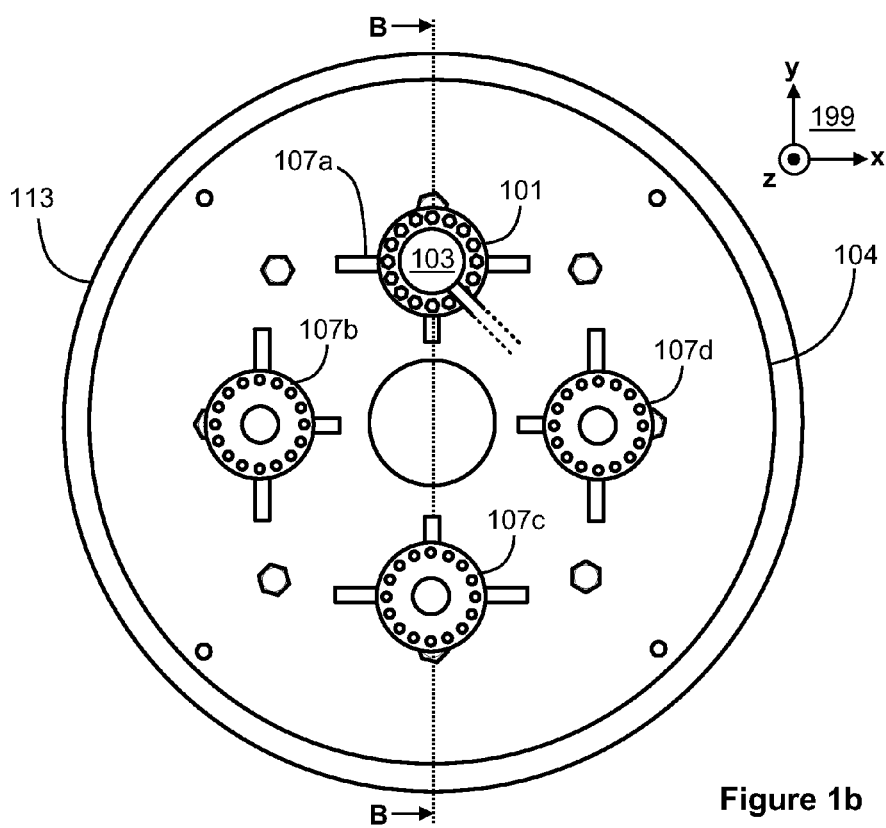
Figure 1C:
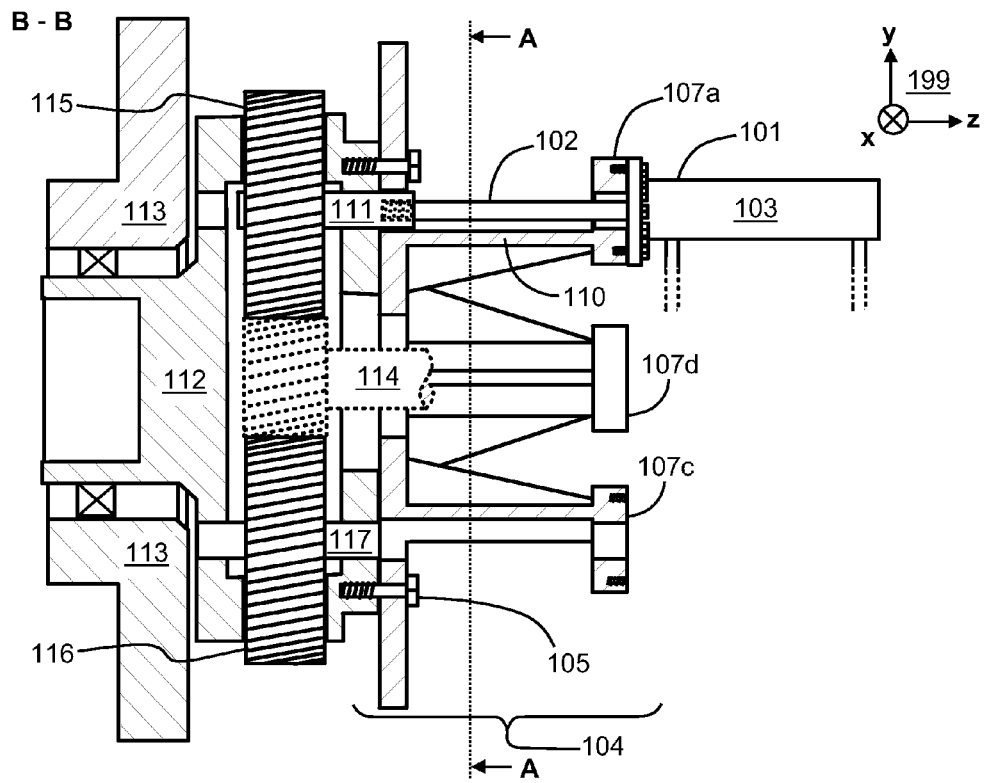
Figure 1D:
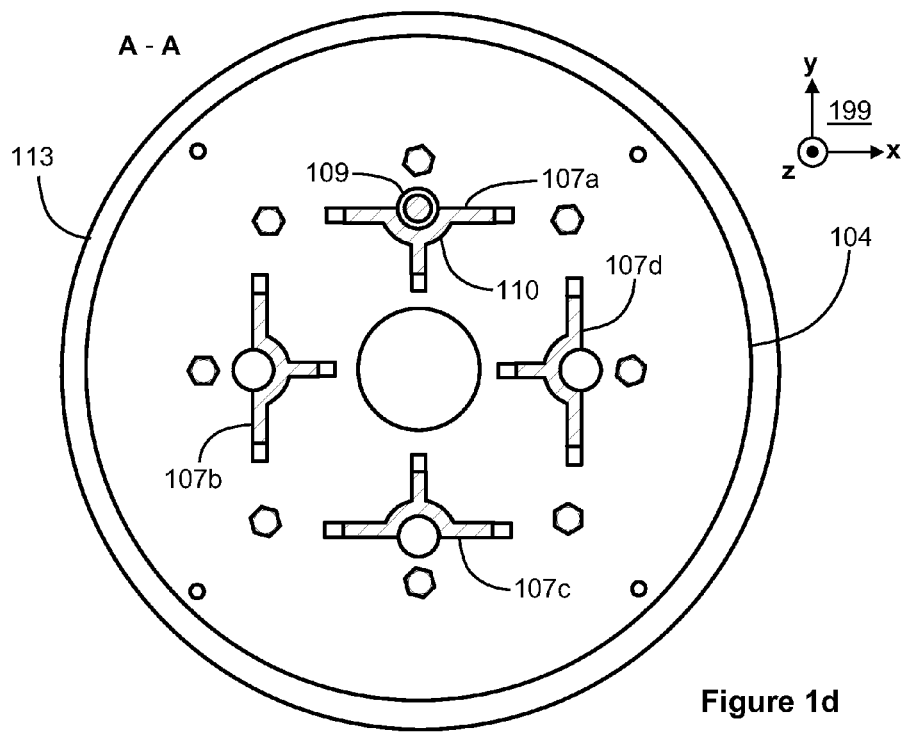

FIG. 1a shows a side view of an arrangement where a maintenance tool according to an exemplifying and non-limiting embodiment of the invention has been installed on a planetary gear. In this exemplifying and non-limiting case, a part of the frame of the planetary gear and the gear ring of the planetary gear have been removed prior to installing the maintenance tool on the planetary gear. FIG. 1b shows a butt-end view of the above-mentioned arrangement. The viewing directions related to FIGS. 1a and 1b are indicated with a coordinate system 199. FIG. 1c shows a view of a section taken along a line B-B shown in FIG. 1b. For the sake of illustration, the planet wheels of the planetary gear are not shown as section views in FIG. 1c. In FIG. 1c, the section plane is parallel with the yz-plane of the coordinate system 199. FIG. 1d shows a view of a section taken along a line A-A shown in FIGS. 1a and 1c. In FIG. 1d, the section plane is parallel with the xy-plane of the coordinate system 199. In FIGS. 1a and 1c, two of the planet wheels of the planetary gear are denoted with reference numbers 115 and 116. In FIG. 1c, the planet wheel pins supporting the planet wheels 115 and 116 are denoted with reference numbers 111 and 117. The sun shaft of the planetary gear is not necessarily in its operating position when the maintenance tool is used. In FIG. 1c, the sun shaft is depicted with dashed lines and denoted with a reference number 114.

The maintenance tool comprises a force generating device 101 that comprises an actuator 102 for fastening to an end of the planet wheel pin 111 and for directing force to the planet wheel pin in the axial direction. The axial direction is parallel with the z-axis of the coordinate system 199. In this exemplifying case, the end of the actuator 102 is a threaded rod matching a centric and axial threaded hole of the end of the planet wheel pin 111. The threaded end of the actuator 102 and the threaded hole of the planet wheel pin 111 are depicted with dashed lines in FIG. 1c. The force generating device 101 further comprises a frame 103 with respect to which the actuator 102 is movable in the axial direction. In this exemplifying case, the force generating device 101 is a hydraulic device that comprises a hydraulic cylinder and a hydraulic piston. It is also possible to use a mechanical force generating device that can be based on e.g. a motor driven threaded rod.

The maintenance tool comprises a body structure 104 for mechanically supporting the frame 103 of the force generating device 101 with respect to the planet carrier 112 of the planetary gear. As the frame 103 of the force generating device is mechanically supported with respect to the planet carrier 112, the actuator 102 is able to move the planet wheel pin 111 axially with respect to the planet carrier 112. In the exemplifying situation shown in FIG. 1c, the planet wheel pin 111 is not in its operating position but the planet wheel pin 111 is being removed or installed depending on the moving direction of the planet wheel pin 111. The exemplifying maintenance tool illustrated in FIGS. 1a-1c further comprises support elements capable of keeping the body structure 104 stationary with respect to the planet carrier when the actuator 102 is axially pushing the planet wheel pin 111 into the planet carrier 112. In FIGS. 1a and 1c, one of the support elements is denoted with a reference number 105. In FIG. 1a, another one of the support elements is denoted with a reference number 106. In this exemplifying case, the support element 105 is a bolt for fastening the body structure 104 of the maintenance tool to the planet carrier 112, and the support element 106 is an adjustable rod for keeping the body structure 104 stationary with respect to a part 113 of the frame of the planetary gear. Is also possible that there are only bolts such as the bolt 105, or there are only adjustable rods such as the adjustable rod 106, or there are support elements of some other kind for pushing and/or pulling the body structure 104 towards the planet carrier 112. In a case where the maintenance tool is used only for removing planet wheel pins from the planet carrier, it is not necessary to have support elements for pushing and/or pulling the body structure 104 towards the planet carrier because, when a planet wheel pin is being drawn out from the planet carrier, the frame 103 of the force generating device 101 pushes the body structure 104 against the planet carrier 112. In this case, the maintenance tool may comprise for example means, such as e.g. adjustable legs, for standing on e.g. a floor so that the maintenance tool is in a desired position with respect to the planet carrier.

In the exemplifying maintenance tool illustrated in FIGS. 1a-1c, the body structure 104 comprises four support sections 107a, 107b, 107c and 107d. Each of the support sections 107a-107d is capable of mechanically supporting the frame 103 of the force generating device with respect to the planet carrier 112. In the exemplifying case illustrated in FIGS. 1a-1c, the planetary gear has four planet wheels and the four support sections 107a-107d of the body structure are pitched at similar intervals on a periphery of a similar circle as is the case with the planet wheel pins. As illustrated in FIGS. 1a and 1c, the force generating device 101 is non-destructively detachable from the body structure 104 so that the force generating device can to be moved from one of the support sections 107a-107d to another one of the support sections. Therefore, the maintenance tool can be used for removing and installing all the planet wheel pins of the planetary gear without a need to rotate the body structure 104 with respect to the planet carrier 112. In the exemplifying situation shown in FIGS. 1a-1d, the force generating device 101 is installed on the support section 107a.

In the exemplifying maintenance tool illustrated in FIGS. 1a-1c, each of the support sections 107a-107d comprises and a gutter section for supporting a planet wheel pin in a position from which the planet wheel pin is axially movable into the planet wheel carrier by the actuator 102 of the force generating device 101. The gutter section of the support section 107a is denoted with a reference number 110 in FIGS. 1a, 1c, and 1d. As shown in FIG. 1d, the groove surface of the gutter section 110 is in line with an aperture 109 through which the planet wheel pin 111 can be removed from the planet carrier and installed on the planet carrier. As shown by FIG. 1d, each of the support sections 107a-107d needs to be substantially in the upmost position, i.e. like the support section 107a in FIGS. 1a-1d, in order that the gutter section of the support section under consideration would be able to support a planet wheel pin in a position from which the planet wheel pin is axially movable into the planet wheel carrier. Typically this means that the planet wheel carrier 112 and the maintenance tool have to be rotated during maintenance work. It is also possible that all the support sections are aligned in a mutually same way so that all the support sections are able to support a planet wheel pin in a position from which the planet wheel pin is axially movable into the planet wheel carrier when the body structure 104 is in a pre-determined position with respect to the direction of the gravity. For example, each of the support sections 107b-107d could be aligned with respect to the coordinate system 199 in the same way as the support section 107a is aligned with respect to the coordinate system 199. In many cases, however, the planet wheel carrier 112 and the maintenance tool need to be rotated during maintenance work because typically the easiest way to remove and install a planet wheel, whose planet wheel pin has been removed, is to use a crane and thus it is advantageous that the place of the planet wheel to be installed or removed is substantially in the upmost position, i.e. in the position of the planet wheel 115. In these cases, it is advantageous that the support sections 107a-107d are aligned in the way illustrated in FIG. 1d.

Figure 2:
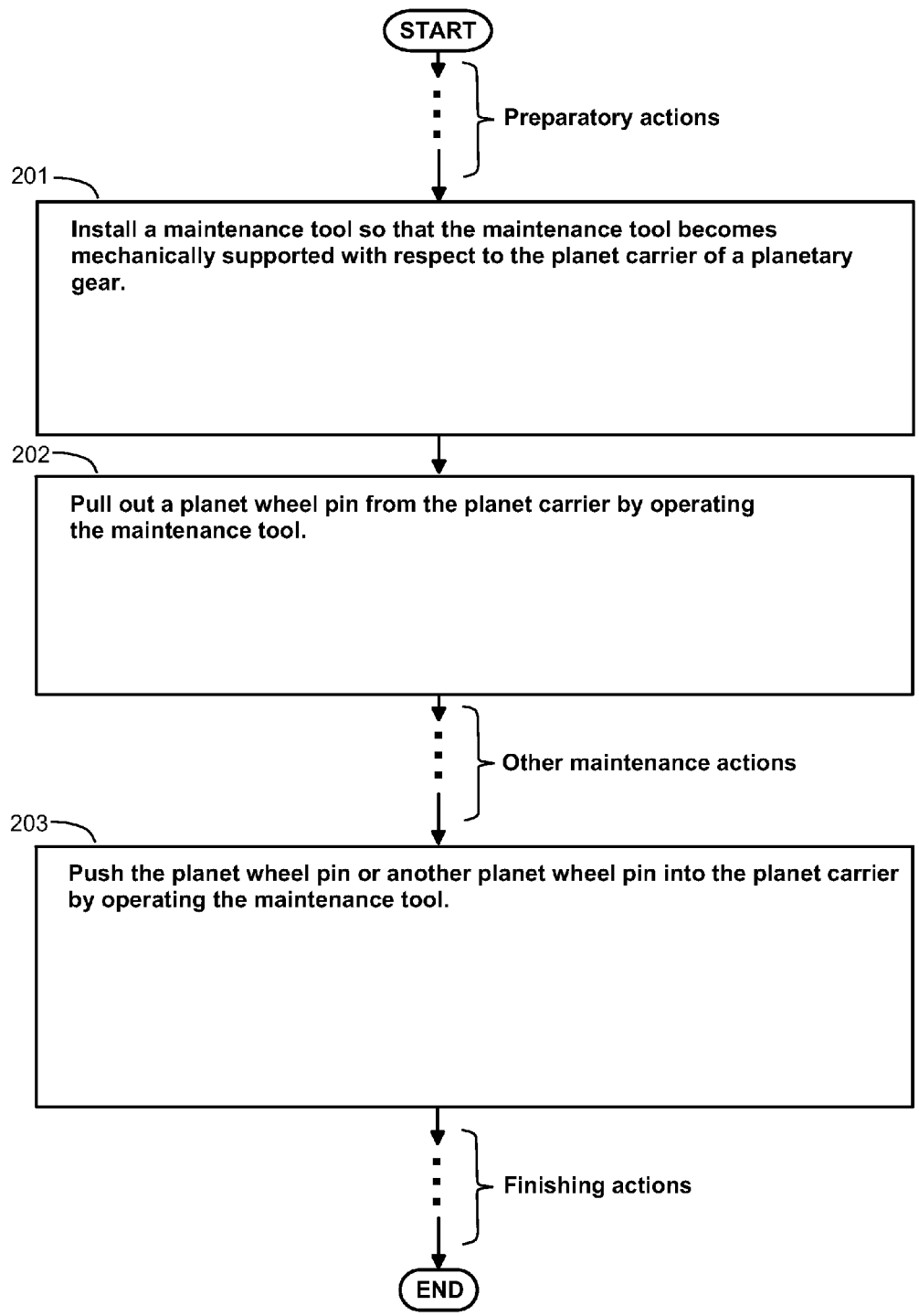
FIG. 2 shows a flowchart of a method according to an exemplifying and non-limiting embodiment of the invention for maintaining a planetary gear.

FIG. 2 shows a flowchart of a method according to an exemplifying and non-limiting embodiment of the invention for maintaining a planetary gear. The method comprises at least the following actions at an operating site of the planetary gear:

action 201: installing a maintenance tool so that the maintenance tool becomes mechanically supported with respect to the planet carrier of the planetary gear,
action 202: pulling out a planet wheel pin from the planet carrier by operating the maintenance tool, and
action 203: pushing the planet wheel pin or another planet wheel pin into the planet carrier by operating the maintenance tool, The above-mentioned maintenance tool can be such as described above with reference to FIGS. 1a-1d.

In a method according to an exemplifying and non-limiting embodiment of the invention, the planetary gear is a part of a wind power plant and the operating site of the planetary gear is the nacelle of the wind power plant.

The preparatory actions referred to in FIG. 2 may comprise for example removing, from a system comprising the planetary gear, such elements and components which need to be removed so as to be able to install the maintenance tool. The other maintenance actions referred to in FIG. 2 may comprise for example replacing a worn planet wheel and/or a worn bearing with new ones. The finishing actions referred to in FIG. 2 may comprise for example installing the elements and components, which were removed during the preparatory actions, back on the system comprising the planetary gear.

The specific examples provided in the description given above should not be construed as limiting the scope and/or the applicability of the accompanied claims. Lists and groups of examples provided in the description given above are not exhaustive unless otherwise explicitly stated.

What is claimed is:

1. A maintenance tool comprising:
a force generating device comprising an actuator for fastening to an end of a planet wheel pin of a planetary gear and for directing axial force to the planet wheel pin, the actuator being movable with respect to a frame of the force generating device and an end of the actuator being a threaded rod for matching a centric and axial threaded hole of the end of the planet wheel pin, and
a body structure for mechanically supporting the frame of the force generating device with respect to a planet carrier of the planetary gear so as to allow the actuator to move the planet wheel pin axially with respect to the planet carrier; wherein the body structure comprises a gutter section for supporting the planet wheel pin in a position from which the planet wheel pin is axially movable into the planet wheel carrier by the actuator of the force generating device.

2. A maintenance tool according to claim 1, wherein the maintenance tool further comprises support elements for keeping the body structure stationary with respect to the planet carrier when the actuator is axially pushing the planet wheel pin into the planet carrier.

3. A maintenance tool according to claim 1, wherein the body structure comprises two or more support sections each being capable of mechanically supporting the frame of the force generating device with respect to the planet carrier so that the maintenance tool is capable of moving two or more planet wheel pins of the planetary gear without a need to rotate the body structure with respect to the planet carrier.

4. A maintenance tool according to claim 3, wherein the maintenance tool further comprises support elements for keeping the body structure stationary with respect to the planet carrier when the actuator is axially pushing the planet wheel pin into the planet carrier.

5. A maintenance tool according to claim 3, wherein the force generating device is non-destructively detachable from the body structure so as to allow the force generating device to be moved from one of the support sections to another of the support sections.

6. A maintenance tool according to claim 5, wherein the maintenance tool further comprises support elements for keeping the body structure stationary with respect to the planet carrier when the actuator is axially pushing the planet wheel pin into the planet carrier.

7. A maintenance tool according to claim 3, wherein each of the support sections comprises and a gutter section for supporting the planet wheel pin in a position from which the planet wheel pin is axially movable into the planet wheel carrier by the actuator of the force generating device.

8. A maintenance tool according to claim 7, wherein the maintenance tool further comprises support elements for keeping the body structure stationary with respect to the planet carrier when the actuator is axially pushing the planet wheel pin into the planet carrier.

9. A maintenance tool according to claim 7, wherein the force generating device is non-destructively detachable from the body structure so as to allow the force generating device to be moved from one of the support sections to another of the support sections.

10. A maintenance tool according to claim 9, wherein the maintenance tool further comprises support elements for keeping the body structure stationary with respect to the planet carrier when the actuator is axially pushing the planet wheel pin into the planet carrier.

11. A maintenance tool according to claim 1, wherein the force generating device comprises a hydraulic cylinder and a hydraulic piston.

* * * * *